United States Patent
May et al.

(10) Patent No.: US 6,195,082 B1
(45) Date of Patent: Feb. 27, 2001

(54) LOW NOISE CIRCUIT BOARD FOR TRACKPOINT POINTING DEVICE

(75) Inventors: Kim Wesley May, San Jose; Edwin Joseph Selker, Palo Alto; Barton Allen Smith, Campbell, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,805

(22) Filed: Mar. 31, 1998

(51) Int. Cl.$^7$ ..................................................... G09G 5/08
(52) U.S. Cl. .......................... 345/161; 200/5 R; 345/168; 400/479
(58) Field of Search .................................. 200/5 A, 5 R; 177/25.15; 273/148 B; 341/20, 34, 23; 345/156, 157, 161, 168; 702/41

(56) References Cited

U.S. PATENT DOCUMENTS

| | | | |
|---|---|---|---|
| 4,845,319 | * | 7/1989 | Watkins et al. ....................... 200/5 A |
| 5,113,955 | * | 5/1992 | Wallisch et al. ................... 177/25.15 |
| 5,489,900 | * | 2/1996 | Cali et al. .............................. 341/34 |
| 5,565,865 | * | 10/1996 | So .......................................... 341/20 |
| 5,579,002 | * | 11/1996 | Iggulden et al. ........................ 341/23 |
| 5,588,760 | * | 12/1996 | So ......................................... 400/495 |
| 5,607,158 | * | 3/1997 | Chan ................................. 273/148 B |
| 5,615,083 | * | 3/1997 | Burnett ................................ 361/686 |
| 5,659,334 | * | 8/1997 | Yangier et al. ....................... 345/156 |
| 5,668,358 | * | 9/1997 | Wolf et al. ............................ 200/5 A |
| 5,754,167 | * | 5/1998 | Narusawa et al. ................... 345/161 |
| 5,767,840 | * | 6/1998 | Selker .................................. 345/161 |
| 5,793,355 | * | 8/1998 | Youens ................................. 345/157 |
| 5,876,808 | * | 2/1999 | Selker et al. ........................... 702/41 |
| 6,040,823 | * | 3/2000 | Seffernick et al. .................. 345/168 |

* cited by examiner

*Primary Examiner*—Steven J. Saras
*Assistant Examiner*—Srilakshmi Kumar
(74) *Attorney, Agent, or Firm*—Robert Buckley

(57) ABSTRACT

A computer pointing device on a single, small printed wiring board includes all electronics necessary for providing a standard mouse-type output signal. The pointing device uses a balanced bridge strain gauge isometric sensor having a manipulation lever for user input. The computer pointing device includes a receiving space for accepting one of a large-size strain gauge sensor and a small-size strain gauge sensor, depending upon the specific application. The computer pointing device includes internal power regulation and has input for up to two momentary switches and two of the pointing devices can be daisy chained with a single, composite output signal. The small-size strain gauge sensor permits use of the pointing device in ultra thin keyboard applications.

17 Claims, 4 Drawing Sheets

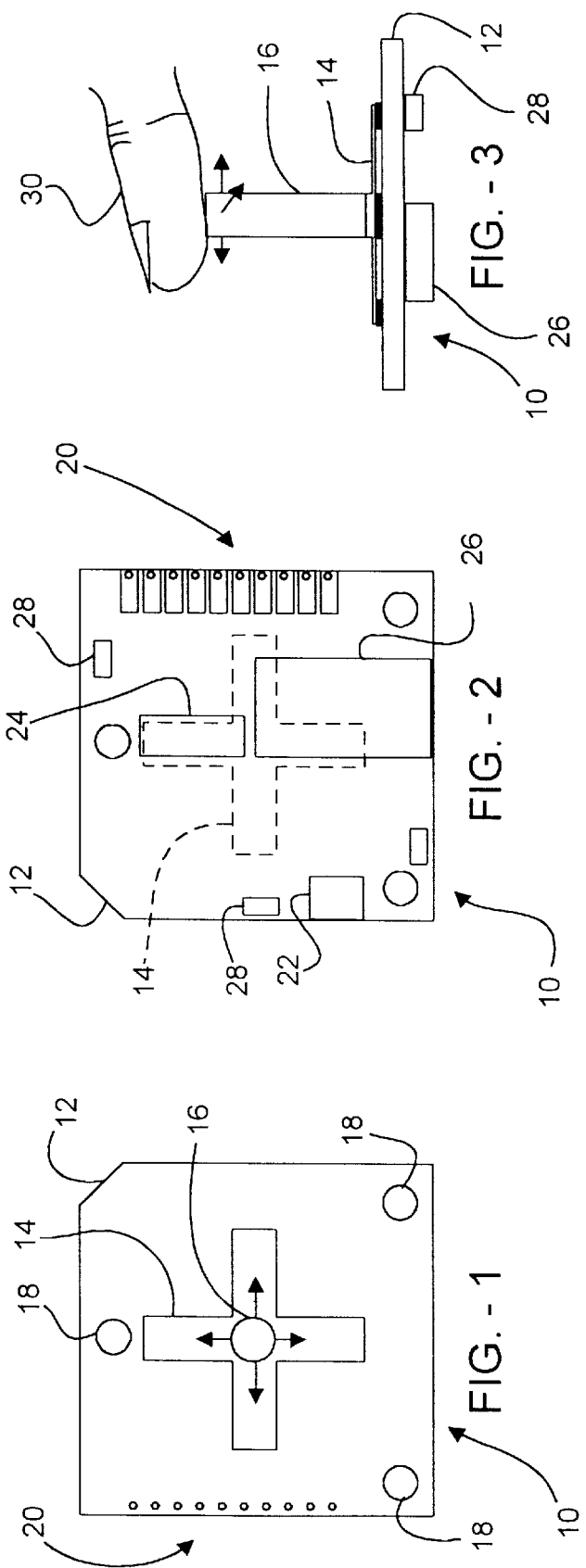

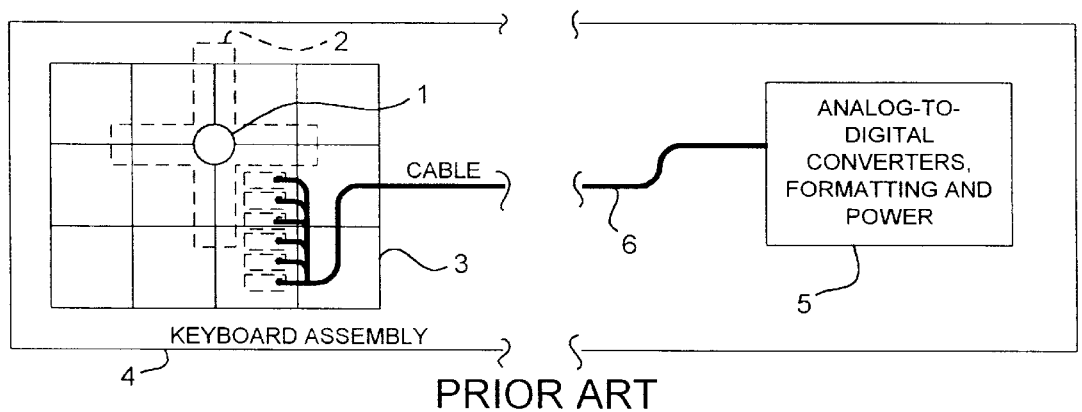
PRIOR ART
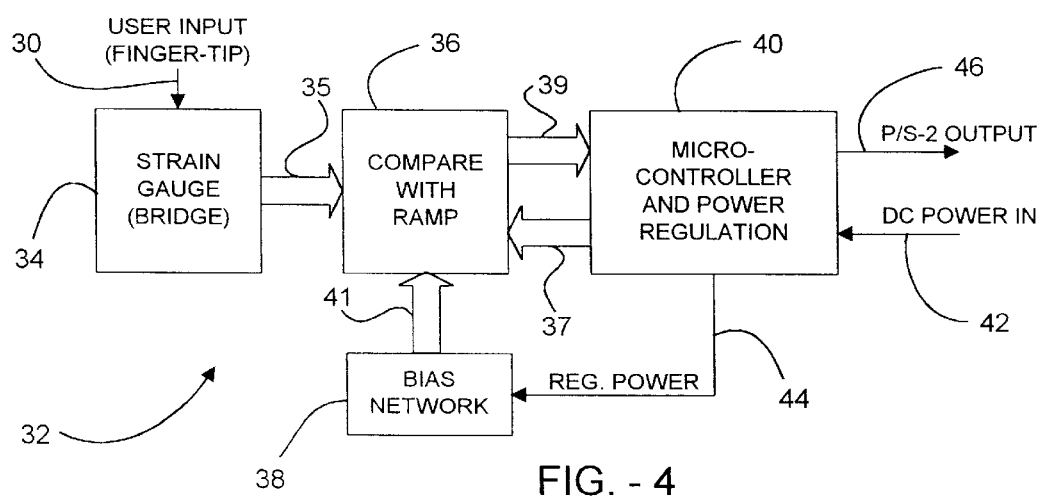
FIG. - 4

LOW NOISE CIRCUIT BOARD FOR TRACKPOINT POINTING DEVICE

RELATED APPLICATION

This Application is related to a co-pending U.S. patent application entitled "A Mini-TrackPoint IV Pointing Device," filed on the same date as the present Application, also to co-pending U.S. patent application entitled "Force Transducer With Screen Printed Strain Gauges," Ser. No. 08/181,648, filed Jan. 14, 1994, which is the parent to Ser. No. 08/688,614, filed Aug. 6, 1996 now U.S. Pat. No. 5,867,808 and to U.S. patent application entitled "Floating Triangle Analog-to-Digital Conversion System and Method," Ser. No. 08/773,420, filed Dec. 27, 1996, now U.S. Pat. No. 5,894,282 all assigned to the International Business Machines Corporation. The disclosure of each related Application is incorporated herein by reference.

FIELD OF THE INVENTION

The invention generally relates to information processing systems, and more specifically, to computer pointing devices used with graphical user interfaces to information processing systems. The invention has a particular applicability to the IBM® TrackPoint® IV pointing device. (IBM and TrackPoint are registered trademarks of the International Business Machines Corporation.)

BACKGROUND OF THE INVENTION

The TrackPoint class of pointing devices employ a ceramic strain gauge balanced resistive bridge network as an isometric sensor for user input. A manipulation lever is attached to a central point on the strain gauge. Force applied to the lever causes the four resistive elements to change resistance in proportion to the amount each is distorted by the applied force. The resistances are measured and a mathematical transformation is performed to convert the changes in resistance to standard mouse-type output signals. In a specific embodiment, the output signals conform to the IBM P/S-2 computer pointing device standard. Basically, the standard mouse-type signals represent velocity in a two-dimensional space. The velocity in a given direction is proportional to the applied force in that direction. Such a pointing device is used, for example, to manipulate a graphical user interface on a computer display screen.

A prior art figure ("PRIOR ART") illustrates the manner in which specific embodiments of the TrackPoint pointing devices are used. The manipulation lever 1 extends from a strain gauge 2, through an opening between several keys 3 of a computer keyboard 4. The circuits 5 which are connected to the strain gauge are located at some distance from the strain gauge and include analog-to-digital converters, digital formatting and power regulation. The low-level analog signals from the strain gauge are connected to the circuits via a cable 6. Though the combination works well, the cable must be assembled and connected by hand, thus increasing the manufacturing cost of the whole assembly.

It would be desirable to eliminate the cost of the manufacturing and assembly steps involving the inter connecting cable.

SUMMARY OF THE INVENTION

It is therefore an object of the invention to provide a lower cost alternative to existing in-keyboard isometric pointing devices, such as earlier versions of the TrackPoint pointing device.

It is another object of the invention to provide a single pointing device which can use one of two alternative sizes of strain gauge for differing applications.

It is another object of the invention to provide a pointing device in which all the low-level analog signals are carried on very short printed wiring and are located in close proximity to the other circuits forming part of the pointing device.

These objects, and others that will become apparent to those skilled in the art, are provided by a computer pointing device including a printed wiring board having two sets of electrical pads defining a receiving space for connection and mechanical support of a large-size and, alternatively, a small-size strain gauge bridge network. The pointing device also includes a manipulation lever connected to the strain gauge for user input. The strain gauge is connected via the printed wiring board to a comparator and bias network. The comparator and bias network is connected via the printed wiring board to a micro-controller and power regulation circuit.

In a specific embodiment, the computer pointing device receives operating power input and a user manipulation input and provides a standard mouse-type output signal as defined by the IBM P/S-2 standard.

In another specific embodiment, the computer pointing device permits components of the bias network to be selected for balancing the strain gauge bridge network.

Another class of embodiments of the invention define an electrical interconnection component for a computer pointing device.

Finally, another class of embodiments of the invention define a computer pointing device sub-assembly, complete with all components except the strain gauge and the selectable bias components.

It is an advantage of the present invention to reduce the manufacturing cost of the TrackPoint computer pointing device by placing all the components on a single, small printed wiring board, thereby eliminating the cost of interconnecting a strain gauge sensor with remote electronics assemblies.

It is another advantage of the present invention to maintain control over potential electrical noise affecting low-lever analog signals by maintaining strict control over the low-level printed wiring line lengths.

Finally, it is an advantage of the invention to provide a single sub-assembly, including a strain gauge receiving space and all the necessary support electronics, which will accept one of a large-size strain gauge and a small size strain gauge.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein:

FIG. 1 is a top view of a computer pointing device according to one aspect of the present invention.

FIG. 2 is a bottom view of the computer pointing device of FIG. 1.

FIG. 3 is a side view of the computer pointing device of FIGS 1, 2.

FIG. 4 is a simplified block diagram of a computer pointing device according to another aspect of the invention.

DESCRIPTION OF THE PREFERRED EMBODIMENT

Figure 5:
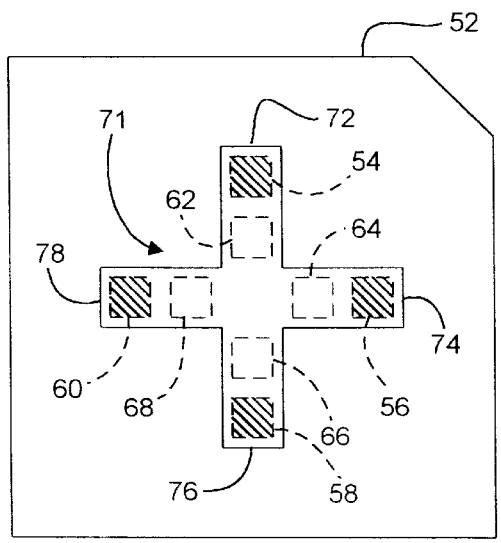
FIG. 5 is a top view of a printed wiring board illustrating placement of contact pads relative to a large size isometric strain gauge.

With reference to FIG. 1 there is shown a top view of a computer pointing device according to one aspect of the present invention. The computer pointing device is designated generally by the numeral 10 and includes a printed wiring board 12, a cross-shaped strain gauge 14 having a finger-tip manipulable lever 16, mechanical attachment openings 18, and electrical cable connection pads 20.

FIG. 2 is a bottom view of the computer pointing device 10 of FIG. 1, and shows a reverse side of the printed wiring board 12, a clock signal oscillator module 22, a comparitor circuit 24, a micro-controller 26, several operating power filter capacitors 28, and a solder-side of the electrical cable connection pads 20. An outline of the strain gauge 14 is shown with a broken line.

FIG. 3 is a side view of the computer pointing device 10 of FIGS 1, 2 showing an edge view of the printed circuit card 12, the micro-controller 26, one filter capacitor 28, and the strain gauge 14 attached to the finger-tip manipulable lever 16. A user's finger tip 30 is shown manipulating the lever 16 for positioning in a planar X-Y coordinate system typical of mouse-type computer pointing devices.

FIG. 4 is a simplified block diagram illustrating an electrical circuit for a computer pointing device according to FIGS 1–3. The computer pointing device electrical circuit is designated generally by the numeral 32, and includes a two-dimensional strain gauge 34 (defining a bridge circuit), comparitor circuits 36, a bias network 38, and a micro-controller and power regulator 40. The strain gauge 34 is manipulated by a user finger-tip input 30. The simplified computer pointing device 32 shown in FIG. 4 receives operating power on an input line 42 and distributes regulated operating power 44 to other elements of the circuit. The simplified computer pointing device 32 also receives the user finger-tip manipulation input 30 and provides a P/S-2 type computer pointing device output signal 46.

In operation, the computer pointing device 32 is connected to a source of operating power (e.g., +5V DC) and the output signal 46 is connected to a P/S-2 mouse input on a computer. The user puts a finger tip 30 against a distal end of the manipulation lever 16 and applies force in the direction he desires a displayed cursor to move on a computer display screen (not shown).

The manipulation lever 16 is attached to the strain gauge 14 at a central point such that force applied in any direction changes the resistance of one or more legs of the bridge circuit 34. The bridge circuit 34 is coupled to the comparator circuit 36 via lines 35 (FIG. 4). The micro-controller generates a ramp analog voltage which it supplies on lines 37 to the comparator circuit 36. The comparator circuit compares the ramp voltage with a low-amplitude analog voltage developed across each leg of the bridge, and generates a digital pulse for each low-amplitude analog voltage whose duration is proportional to the level of the low-amplitude analog voltage. These pulses are coupled to the microcontroller via lines 39. The micro-controller 40 measures the pulse duration provided for each leg of the bridge, and from those measurements determines the direction and amount of force applied by the user to the manipulation lever 16. The micro-controller 40 then converts the measurements into a standard P/S-2 output signal, which is presented on line 46.

Please note that a convention followed in the electronics industry refers to a signal and also to a line carrying the signal by the same name. That convention is followed here. A distinction between the two will be made only when believed necessary to avoid confusion.

In a specific embodiment, the bias network 38 includes components which are selected to balance the bridge after a particular strain gauge has been installed. There are two sizes of strain gauge: a large size, and a small size. Each size has its own electrical characteristics. The use of selectable components in the bias network permits the bridge 34 to be balanced once the strain gauge is installed in the pointing device and when no force is applied to the lever 16. The bias network 38 is connected to the comparator circuit 36 via lines 41.

In another specific embodiment, the micro-controller 40 includes a power regulation circuit used to regulate the DC power received on line 42. The regulated power is distributed to the other elements of the computer pointing device 32, for example via line 44.

Another embodiment of the invention is shown in FIG. 5, a simplified top view of an electrical interconnection component for a computer pointing device of a type using a finger-tip manipulable two-dimensional strain gauge for user input. The interconnection component is designated generally by the numeral 50, and includes a printed wiring board 52 and electrical contact pads 54–68 disposed on a surface 70 of the printed wiring board 52. The electrical contact pads 54–68 are disposed for a compatible electrical mating with corresponding electrical contact pads of a first (large) size two-dimensional strain gauge (pads 54–60) and alternatively, of a second (small) size two-dimensional strain gauge (pads 62–68).

An outline 71 of a top view of the large size strain gauge is shown having four legs 72–78 connected at a common center at right angles to one another. A distal end of each leg includes an electrical contact pad for compatible mating with contact pads 54, 56, 58 and 60, respectively. The strain gauge does not form part of the interconnect component 50.

Figure 6:
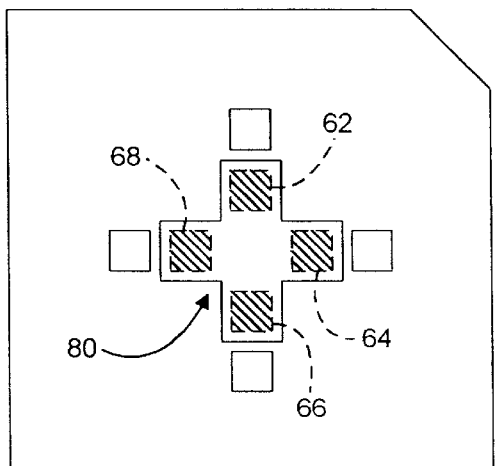
FIG. 6 is a top view of the printed wiring board of FIG. 5 illustrating placement of contact pads relative to an alternative small size isometric strain gauge.

FIG. 6 is a top view of the electrical interconnection component 50 showing an outline 80 of a top view of the small size strain gauge. The distal ends of the legs of the small size strain gauge include electrical contact pads for compatible mating with contact pads 62–68, respectively.

In FIG. 5, the outline 71 of the large strain gauge and the contact pads 54–60 define a receiving space for a large size two-dimensional strain gauge. In FIG. 6, the outline 80 of the small strain gauge and the contact pads 62–68 define a receiving space for a small size two-dimensional strain gauge.

The interconnect component 50 also includes printed wiring (not shown), including the electrical contact pads 54–68, defining an electrical interconnection network for a computer pointing device of the type described. The defined electrical interconnection network includes printed wiring electrical component pads for receiving electrical bias components for adjusting bias for a two-dimensional strain gauge. The interconnected bias components define a bias network (38 of FIG. 4).

Figure 7:
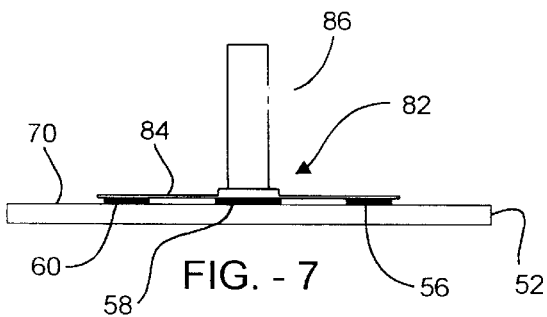
FIG. 7 is a side view of the printed wiring board of FIG. 5 with a large strain gauge attached.

FIG. 7 is a side view of the electrical interconnection component 50 of FIG. 5 showing attachment of a large-size strain gauge. The strain gauge is designated generally by the numeral 82, and includes a cross-shaped strain gauge member 84 and an attached manipulation lever 86. The electrical contact pads located at the distal ends of the four legs of the strain gauge member 84 are shown attached, mechanically and electrically to corresponding electrical pads 56, 58 and 60 on the surface 70 of the printed wiring board 52 (the solder connection to electrical pad 54 is hidden behind pad 58 and is not shown). In a specific embodiment, the strain gauge is attached to the mating pads of the printed wiring board 52 by solder.

Figure 8:
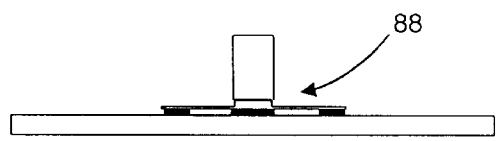
FIG. 8 is a side view of the printed wiring board of FIG. 6 with a small strain gauge attached.

FIG. 8 is a side view of the electrical interconnection component 50 of FIG. 6 showing attachment of a small-size strain gauge, designated generally by the numeral 88. As stated above, the strain gauge 88 is not an element of the electrical interconnection component 50, but is shown to aid in understanding this specific embodiment of the invention.

Figure 9:
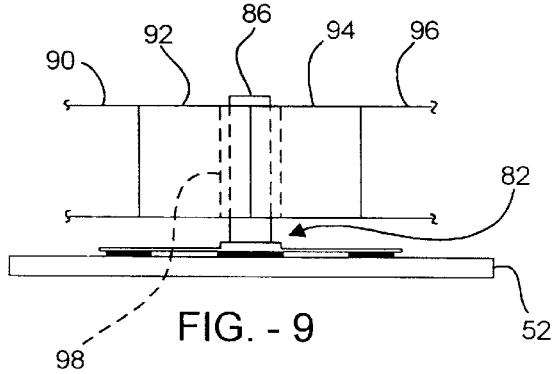
FIG. 9 is a side view of the printed circuit board and large strain gauge of FIG. 7 relative to a portion of a standard (thick) keyboard.

FIG. 9 is a side view of the electrical interconnection component 50 and the large-size strain gauge 82 of FIG. 7 in relation to a portion of a standard size keyboard (showing individual keys 90–96). The printed wiring board 52 and attached strain gauge 82 are located below the keys, while the manipulation lever 86 extends through an opening 98 formed at the intersection of keys 92, 94, so that a distal end of the lever 86 extends above the tops of the keys for user manipulation.

Figure 10:
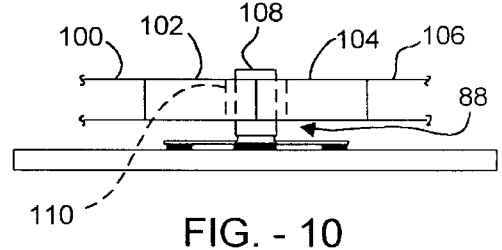
FIG. 10 is a partial side view of the printed circuit board and small strain gauge of FIG. 8 relative to a portion of a thin keyboard.

FIG. 10 is a side view of the electrical interconnection component 50 and the small-size strain gauge 88 of FIG. 8 in relation to a portion of a thin keyboard (keys 100–106 are shown). A manipulation lever 108 extends through opening 110 formed at the intersection of keys 102, 104.

Figure 11:
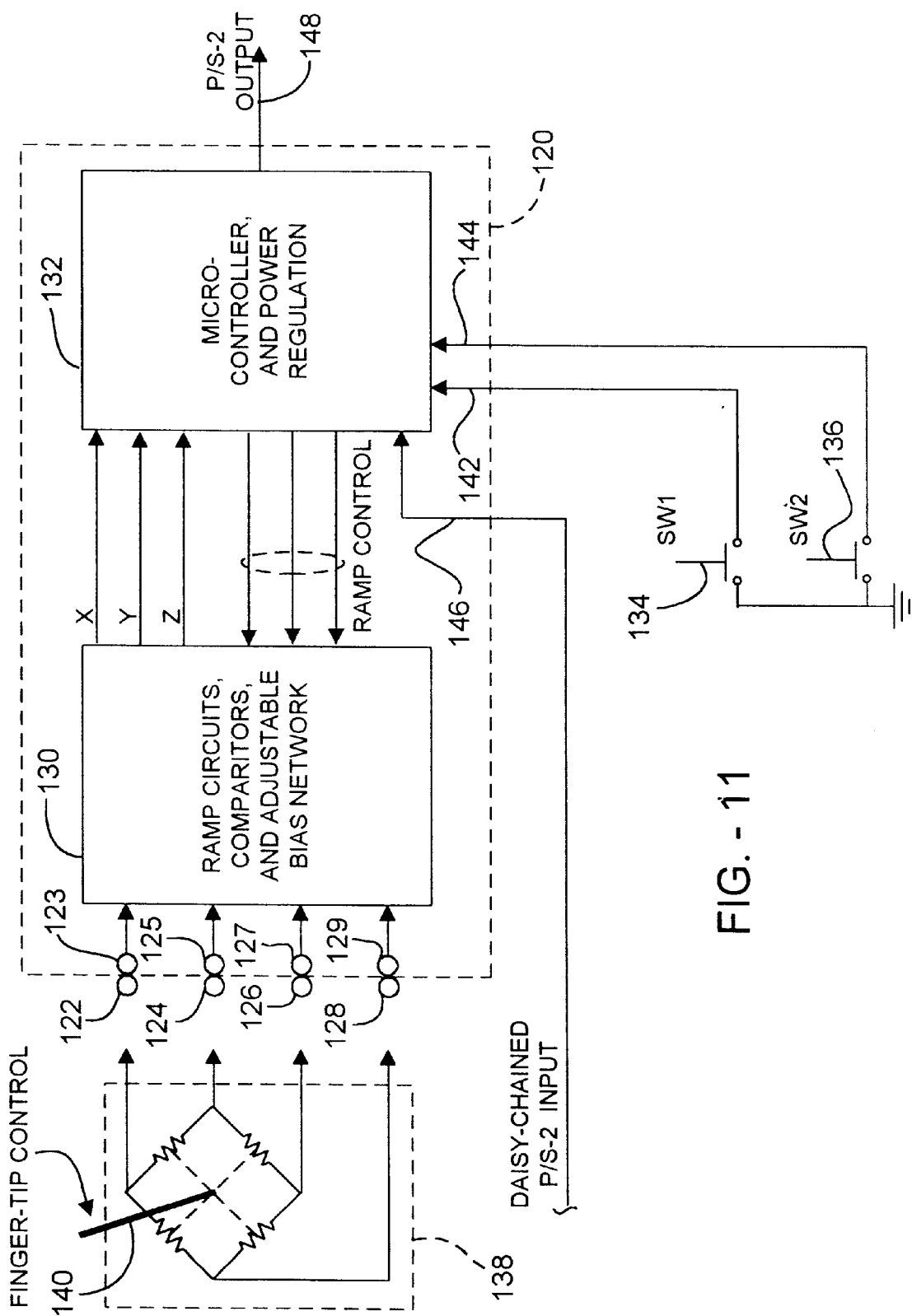
FIG. 11 is a simplified schematic diagram of a computer pointing device according to another aspect of the invention.

Another embodiment of the invention is illustrated in FIG. 11, a simplified schematic diagram. This embodiment defines a computer pointing device sub-assembly, designated by the numeral 120. The sub-assembly 120 includes a printed wiring board (not shown, but see printed wiring board 12 of FIG. 1), electrical contacts 122–129, an adjustable bias and comparitor network 130, and a micro-controller and power regulation circuit 132.

The electrical contacts 122–129 define a receiving space for a strain gauge 138. The strain gauge 138 defines an electrical bridge network in which the resistance of each leg of the bridge varies proportionally to a force applied to a manipulation lever 140. The adjustable bias network includes electrical contact pads which define a receiving space for bias components used to balance the bridge network when no force is applied to the lever 140. It will be appreciated that the strain gauge 138 and the bias components are not a part of the sub-assembly 120. However, the addition of a strain gauge 138 and bias components to the defined receiving spaces of the sub-assembly 120 forms a complete computer pointing device.

The electrical contacts 122–129 are arranged about a common center on one surface of the printed wiring board as illustrated in FIGS 5, 6. And the strain gauge receiving space defined by the electrical contacts 122–129 are immediately adjacent the networks 130 and the micro-controller 132, as illustrated in FIGS 1–3. The receiving space and one set of the electrical contacts 122, 124, 126 and 128 are arranged to receive a large-size strain gauge, as illustrated in FIGS 5, 7 and 9. The receiving space and the other set of the electrical contacts 123, 125, 127 and 129 are arranged to receive a small-size strain gauge, as illustrated in FIGS 6, 8 and 10. The bias components are selected from precision resistors (±1% tol.) for balancing the bridge network of the received strain gauge.

The sub-assembly 120 includes printed wiring for connecting up to two manually operated momentary switches 134, 136 to micro-controller 132 input lines 142, 144. The sub-assembly 120 also includes printed wiring for connecting a P/S-2 output line of a second daisy-chained pointing device (not shown) to an input line 146 of the micro-controller 132. Again, it will be appreciated that neither the second pointing device nor the momentary switches 134, 136 form part of the sub-assembly 120.

The sub-assembly 120 also includes printed wiring for connecting an output line 148 of the micro-controller 132 to another electrical assembly.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. A computer pointing device, comprising:
    a printed wiring board defining an electrical interconnection network;
    the printed wiring board including first and second sets of printed wiring pads disposed around a common center on one surface of the board;
    each set of printed wiring pads defining a receiving space for accepting and making electrical connection with a finger-tip manipulable strain gauge;
    the first set of printed wiring pads being disposed for compatible mating with a strain gauge of a first size and sensitivity;
    the second set of printed wiring pads being disposed for compatible mating with a strain gauge of a second size and sensitivity;
    a strain gauge having a finger-tip manipulable lever, the strain gauge providing two-dimensional strain gauge output signals having signal levels proportional to a force applied to the lever; and
    a micro-controller and comparitor circuits connected via the printed wiring board for receiving the two-dimensional strain gauge output signals and for converting the signals to a standard P/S-2 pointing device output signal.

2. The computer pointing device as set forth in claim 1, wherein the strain gauge defines a four-terminal bridge circuit.

3. The computer pointing device as set forth in claim 2, further including bias components having values selected for balancing the bridge circuit, the bias components defining a bias network.

4. The computer pointing device as set forth in claim 1, further including power regulation circuits for regulating operating power for the computer pointing device.

5. The computer pointing device as set forth in claim 4, wherein the microcontroller includes the power regulation circuits.

6. An electrical interconnection component for a computer pointing device of a type using a finger-tip manipulable two-dimensional strain gauge for a user input, the strain gauge being one of a first and a second size, the electrical interconnection component comprising:

a printed wiring board;

electrical contact pads disposed on one surface of the printed wiring board for compatible electrical mating with corresponding electrical contact pads of a two-dimensional strain gauge of a first size and a second size; and printed wiring, including the electrical contact pads, disposed on the printed wiring board and defining an electrical interconnection network for a computer pointing device.

7. The electrical interconnection component as set forth in claim 6, further including the printed wiring board defining a space for receiving a two-dimensional strain gauge of a first size and a second size.

8. The electrical interconnection component as set forth in claim 7, further including printed wiring electrical component pads for receiving electrical bias components for adjusting bias for a two-dimensional strain gauge.

9. The electrical interconnection component as set forth in claim 6, further including the electrical contact pads being disposed about a common center.

10. A computer pointing device sub-assembly, comprising:

a printed wiring board defining an electrical interconnection network;

the electrical interconnection network including first electrical contacts disposed on a surface of the printed wiring board for compatible mating with corresponding electrical contacts of a strain gauge bridge of a first size, and defining a receiving space for a strain gauge of the first size;

the electrical interconnection network including second electrical contacts disposed on a surface of the printed wiring board for compatible mating with corresponding electrical contacts of a strain gauge bridge of a second size, and defining a receiving space for a strain gauge of the second size;

printed wiring electrical component pads forming part of the electrical interconnection network for receiving electrical bias components for adjusting bias for proper operation of the computer pointing device with exactly one of the first and the second strain gauge bridges, and defining an adjustable bias interconnect network;

a circuit interconnected by a portion of the electrical interconnection network and including the adjustable bias interconnect network, a comparitor network, and a micro-controller for receiving electrical signals from the two-dimensional strain gauge and for converting the signals to a standard P/S-2 computer pointing device output signal.

11. The sub-assembly as set forth in claim 10, further including the first and the second electrical contacts being disposed on a common surface of the printed wiring board.

12. The sub-assembly as set forth in claim 10, further including the first and the second electrical contacts being disposed about a common center.

13. The sub-assembly as set forth in claim 10, further including the first and the second electrical contacts being disposed adjacent the interconnected circuit including the adjustable bias interconnect network, the comparitor network, and the micro-controller.

14. The sub-assembly as set forth in claim 10, further including first printed wiring means for connecting a first momentary switch to a first input line of the micro-controller.

15. The sub-assembly as set forth in claim 14, further including second printed wiring means for connecting a second momentary switch to a second input line of the micro-controller.

16. The sub-assembly as set forth in claim 10, further including printed wiring means for connecting a P/S-2 type output signal to an input line of the micro-controller for daisy-chaining two computer pointing devices.

17. The sub-assembly as set forth in claim 10, further including circuits for regulating operating power for the computer pointing device.

* * * * *